(12) United States Patent
Yu-San

(10) Patent No.: US 6,402,334 B1
(45) Date of Patent: Jun. 11, 2002

(54) LIGHT PIPE WITH QUADRASPHERICAL DEPRESSIONS FOR DISPLAY PANELS

(75) Inventor: Lee Yu-San, Taoyuan (TW)

(73) Assignee: Garmin Corporation (TW)

( * ) Notice: Subject to any disclaimer, the term of this patent is extended or adjusted under 35 U.S.C. 154(b) by 0 days.

(21) Appl. No.: 09/252,395

(22) Filed: Feb. 18, 1999

(51) Int. Cl.[7] .............................................. F21V 7/04
(52) U.S. Cl. ........................ 362/31; 362/26; 362/339; 362/330
(58) Field of Search ...................... 362/551, 31, 307, 362/311, 330, 329, 26, 23, 339

(56) References Cited

U.S. PATENT DOCUMENTS

| | | | |
|---|---|---|---|
| 4,289,383 A | 9/1981 | Schwarzschild | 350/334 |
| 4,466,701 A | 8/1984 | Ogata et al. | 350/366 |
| 4,811,507 A * | 3/1989 | Blanchet | 40/546 |
| 5,005,108 A | 4/1991 | Pristash et al. | 362/31 |
| 5,053,928 A * | 10/1991 | Pasco | 362/31 |
| 5,237,449 A * | 8/1993 | Nelson et al. | 359/532 |
| 5,311,339 A | 5/1994 | Fertig et al. | 359/73 |
| 5,575,549 A * | 11/1996 | Ishikawa et al. | 362/31 |
| 5,584,556 A * | 12/1996 | Yokoyama et al. | 362/31 |
| 5,613,751 A | 3/1997 | Parker et al. | 362/31 |
| 5,618,096 A | 4/1997 | Parker et al. | 362/31 |
| 5,775,791 A * | 7/1998 | Yoshikawa et al. | 362/31 |
| 5,931,555 A * | 8/1999 | Akahane et al. | 362/31 |

OTHER PUBLICATIONS

Merriam–Webster's Collegiate Dictionary, definition of "quadri" and definition of "sphere".
Unidata definition of quadrasphere.
Google.com search engine results of the term "quadrasphere".

* cited by examiner

Primary Examiner—Thomas M. Sember
(74) Attorney, Agent, or Firm—Devon A. Rolf

(57) ABSTRACT

A light pipe for use in a backlight for a display panel. The light pipe is formed by a clear plastic panel which receives light at one edge. The panel face is provided with a plurality of quadraspherical depressions which may be arranged in parallel rows. Along each row, the depressions become progressively larger and progressively closer together. The presence of the depressions enhances the efficiency and uniformity of the light distribution from the light pipe panel.

3 Claims, 6 Drawing Sheets

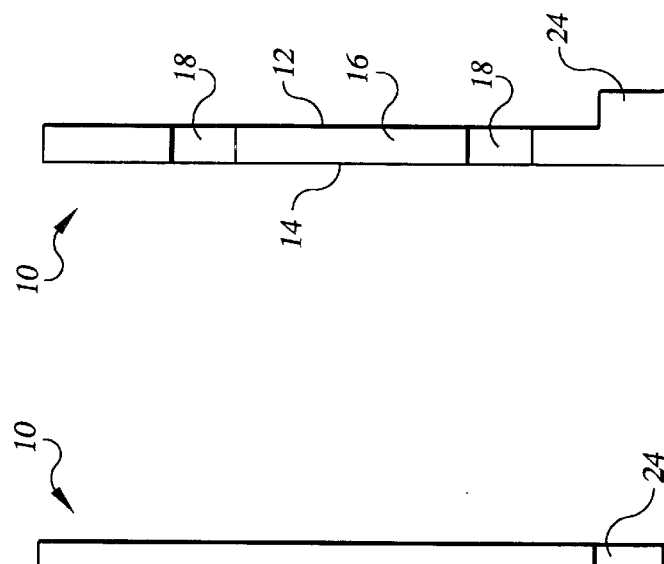
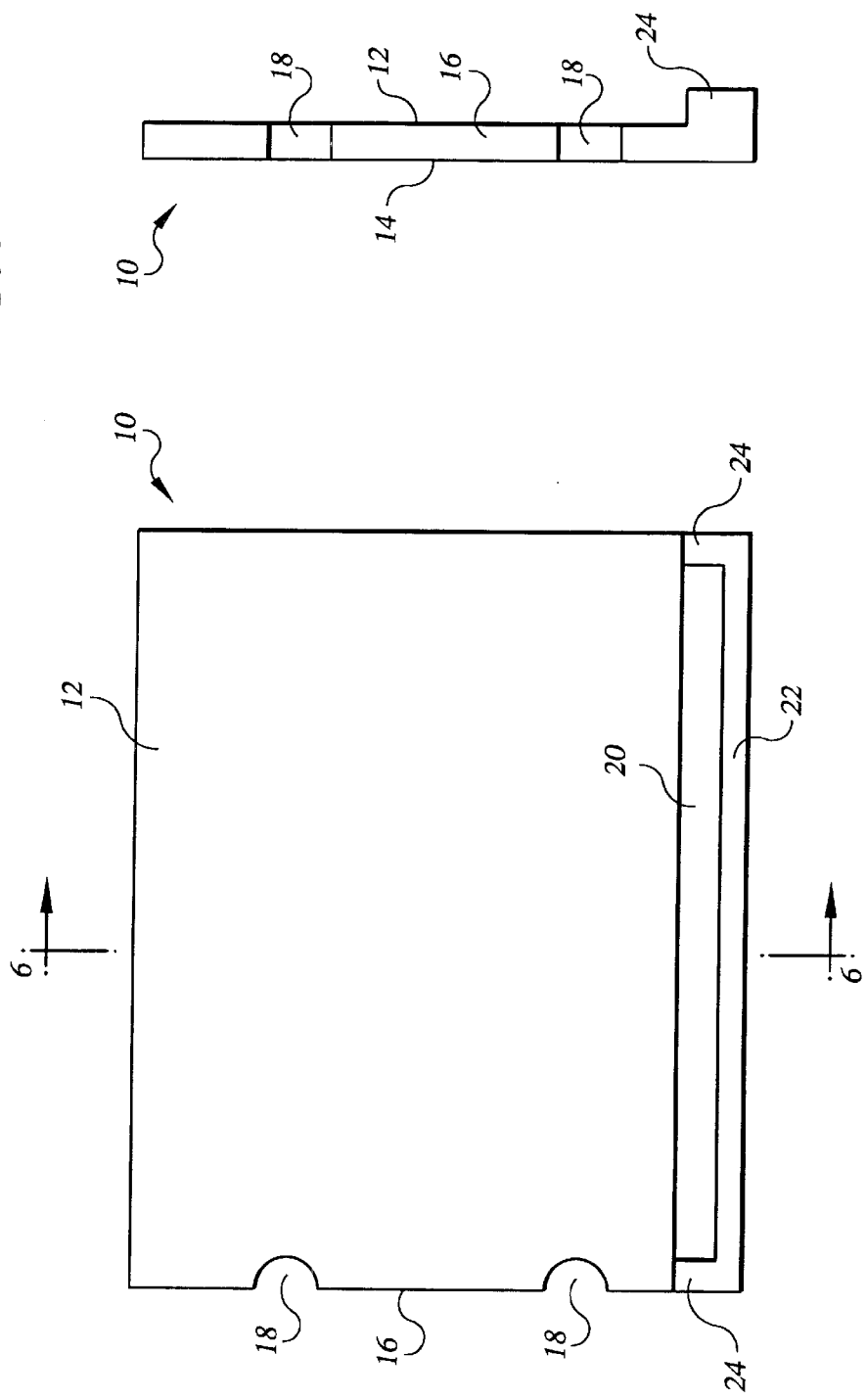

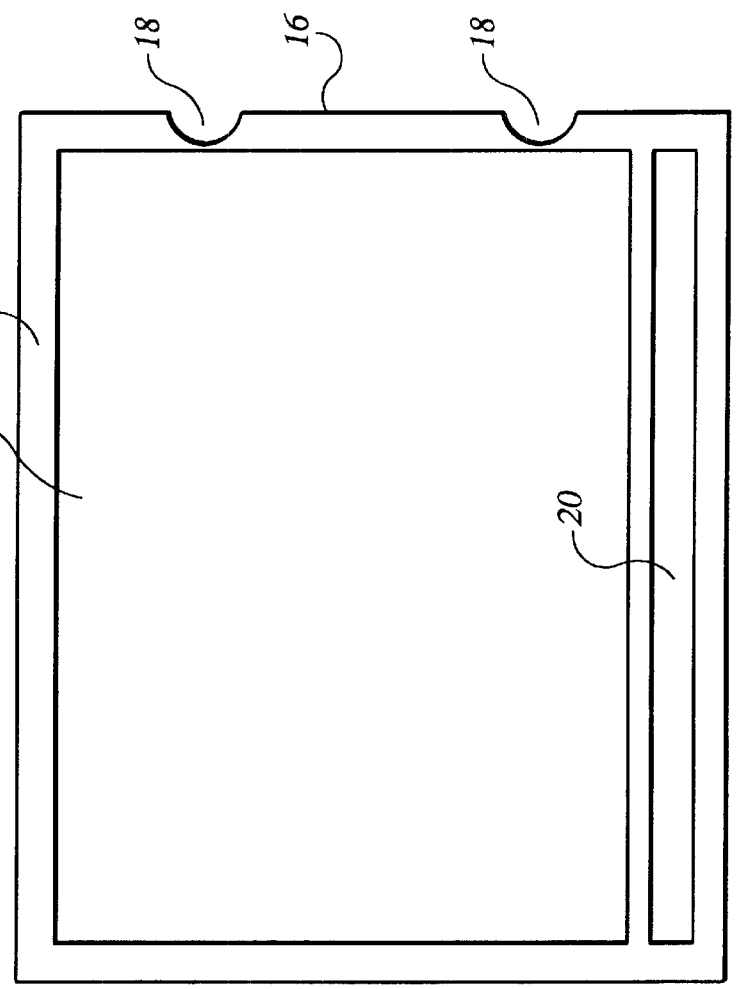
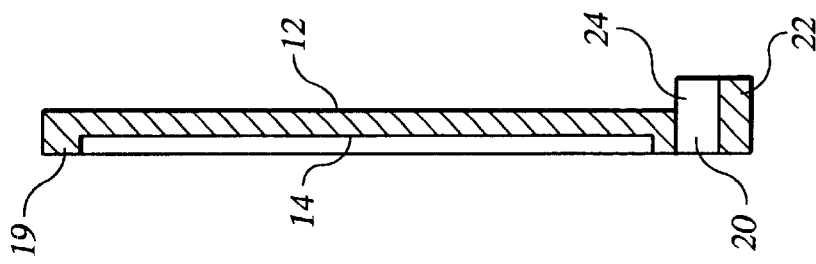

LIGHT PIPE WITH QUADRASPHERICAL DEPRESSIONS FOR DISPLAY PANELS

FIELD OF THE INVENTION

This invention relates generally to display panels and more particularly to a unique light pipe of the type used in backlighting for the distribution of light in light emitting display panels.

Still more particularly, the invention relates to a light pipe having quadraspherical depressions which are varied in size and proximity to one another across the light pipe surface.

BACKGROUND OF THE INVENTION

Panel assemblies are commonly used in visual displays in a variety of applications to provide distribution of light in a pattern that is favorable for viewing of the display. It is common. practice for light emitting panel assemblies of this type to include a clear plastic panel known as a light pipe. The light pipe is typically an acrylic or polycarbonate panel into which light is directed through the panel edge. The light that is introduced into the light pipe reflects from a reflective surface such as a light colored surface or a molded in detail. The reflected light escapes from the light pipe and is used for illumination in the display assembly.

Various techniques have been used to enhance the efficiency of the light pipe so that as much light as possible is directed toward the viewer. Equally important is even distribution of the light to assure uniformity in the intensity of the light across the light pipe surface. Among the techniques that have been used to enhance the efficiency and uniformity of the light is the practice of providing small slots in the back surface of the light pipe to serve as reflectors. As disclosed in U.S. Pat. No. 5,005,108 to Pristash et al. and U.S. Pat. Nos. 5,613,751 and 5,618,096 to Parker et al., disruptions or deformities in the panel have also been proposed. While all of these techniques provide results that are satisfactory in many respects, there is considerable room for improvement in the areas of efficiency and uniformity.

SUMMARY OF THE INVENTION

The present invention is directed to a light pipe having a plurality of quadraspherical depressions which provide increased efficiency in the use of light and which effect distribution of the light in a uniform manner across the light pipe surface.

In accordance with the invention, a light pipe for use in a display panel backlight takes the form of a clear plastic panel. Quadraspherical depressions are provided in at least one face of the panel to enhance the efficiency and the uniformity of the light distribution. When incorporated in a backlight panel assembly, the light pipe panel is sandwiched between a base panel and a display cover panel. Light emitting diodes or another light source applies light into the edge of the light pipe panel.

Preferably, the depressions are arranged in rows. Along each row, the depressions vary in size and may become progressively larger from one end of each row to the other end. Also, the depressions may vary in their proximity to the adjacent depressions in each row. In particular, the depressions in each row may be progressively closer together from one end of the row to the opposite end. This pattern has been found to be efficient in distributing the light, and the unique quadraspherical shape of each of the depressions enhances the overall efficiency and uniformity of light distribution.

BRIEF DESCRIPTION OF THE DRAWINGS

In the accompanying drawings which form a part of the specification and are to be read in conjunction therewith and in which like reference numerals are used to indicate like parts in the various views:

FIG. 3 is a plan view of the panel shown in FIG. 1;

FIG. 4 is an end elevational view of the panel;

FIG. 5 is a plan view of the panel taken from the side opposite the side visible in FIG. 3;

FIG. 6 Is a sectional view through the panel taken generally along line 6—6 of FIG. 3 in the direction of the arrows;

DETAILED DESCRIPTION OF THE INVENTION

Figure 2:
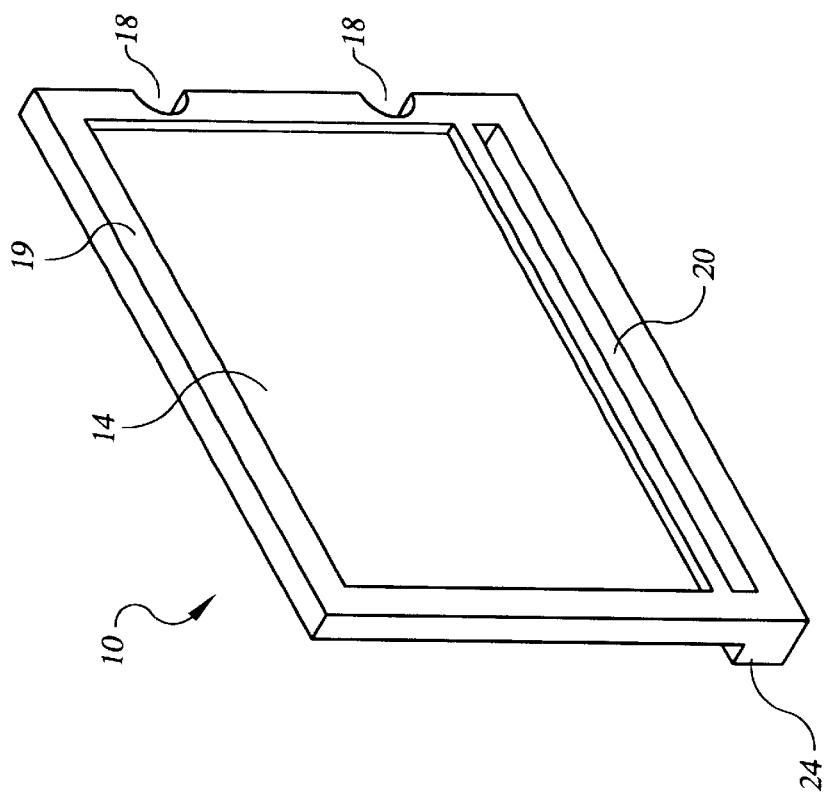
FIG. 2 is a perspective view of the panel shown in FIG. 1 taken from the opposite side thereof.
Figure 1:
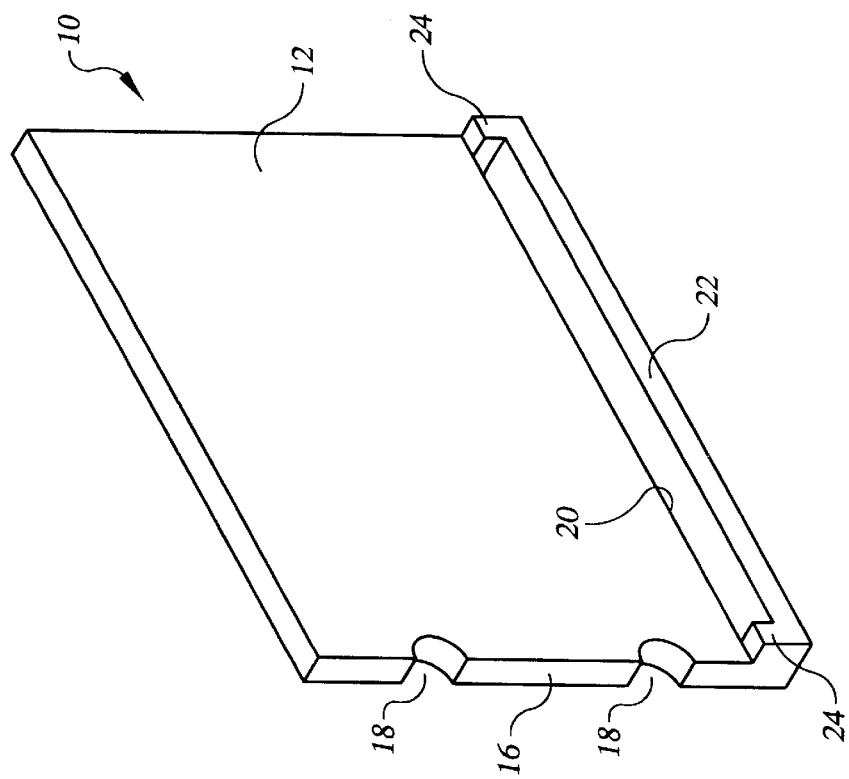
FIG. 1 is a perspective view of a light pipe panel constructed in accordance with a preferred embodiment of the present invention.

Referring now to the drawings in more detail and initially to FIGS. 1–6, numeral 10 generally designates a plastic panel which forms a light pipe in accordance with a preferred embodiment of the present invention. The panel 10 is constructed of a clear plastic such as acrylic or polycarbonate. The panel 10 has flat opposite faces 12 and 14 and a generally rectangular perimeter. The panel 10 has a side edge 16 which may be provided with a pair of spaced apart notches 18. The face 14 occupies a plane which is recessed slightly from the surrounding rim portion 19 of the panel.

A thin rectangular slot 20 is formed through panel 10 at a location near its lower edge. On the side of the panel which includes the face 12, the lower edge of the slot is bounded by a projecting rib 22. Extending from the opposite ends of the rib 22 are a pair of short lips 24 which are adjacent to the opposite ends of the slot 20.

Figure 7:
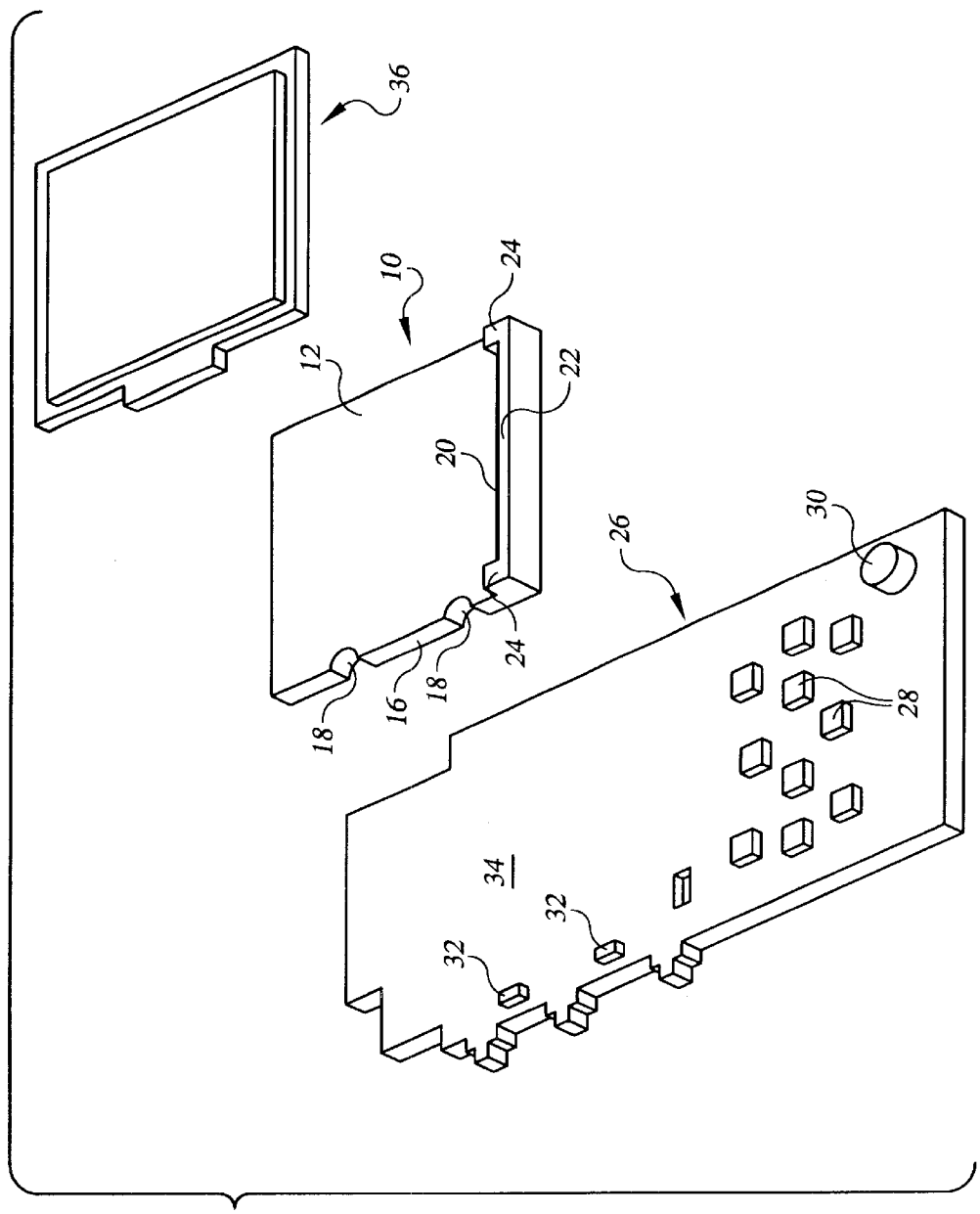
FIG. 7 is an exploded perspective view of a light emitting panel assembly incorporating the light pipe panel of the present invention.

The panel 10 may be used in a backlight assembly having additional components such as those illustrated in FIG. 7. A flat base panel 26 may be provided on one of its surfaces with a key pad having a plurality of keys 28 and other controls such as a button or knob 30. The base panel 26; may include various slots and lugs used for connection of the components in the panel assembly. A pair of light emitting diodes 32 may be located on the face of panel 26 near one of its side edges. The spacing between the LEDs 32 coincides with the spacing between the notches 18, and the LEDs 32 have a size to be received in the notches 18 when the display panel is assembled. The main surface 34 of the base panel 26 may be painted white or provided with some type of reflective surface or structure for reflection of light toward the light pipe panel 10 which overlies the base panel when the panels are assembled.

With continued reference to FIG. 7 in particular, the backlight panel assembly includes a display panel which is generally identified by numeral 36 and which generally coincides in size and shape with the light pipe panel 10. The display panel 36 may be equipped with any suitable type of display system. The panels shown in FIG. 7 are assembled by placing the light pipe panel 10 on surface 34 of the base panel 26. The display panel 36 is then placed on the light pipe panel 10, and all of the panels 10, 26 and 36 are assembled and held together by any suitable type of fastening means. The light pipe panel 10 is sandwiched between the base panel 26 and the display panel 36, and the LEDs 32 fit in the notches 18 in order to emit light which is introduced into panel 10 through the edge 16. The light that is introduced into the light pipe panel 10 is transmitted through the clear light pipe and reflects from the reflective surface 34 to the display panel 36 for use in the visual display.

Figure 8:
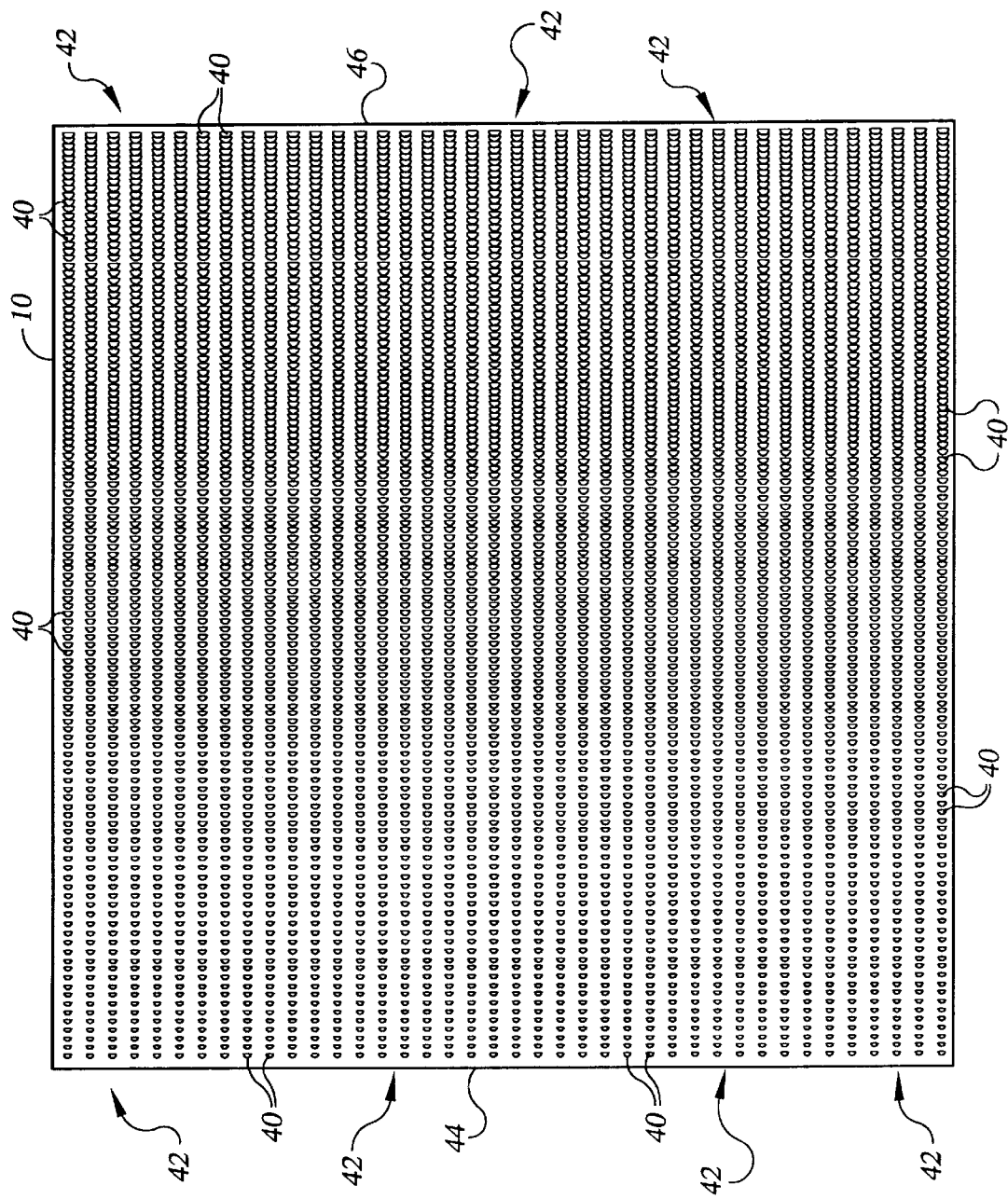
FIG. 8 is a fragmentary plan view showing the quadraspherical depressions which are formed in the light pipe panel in a preferred pattern involving variation of the size and spacing of the depressions.
Figure 9:
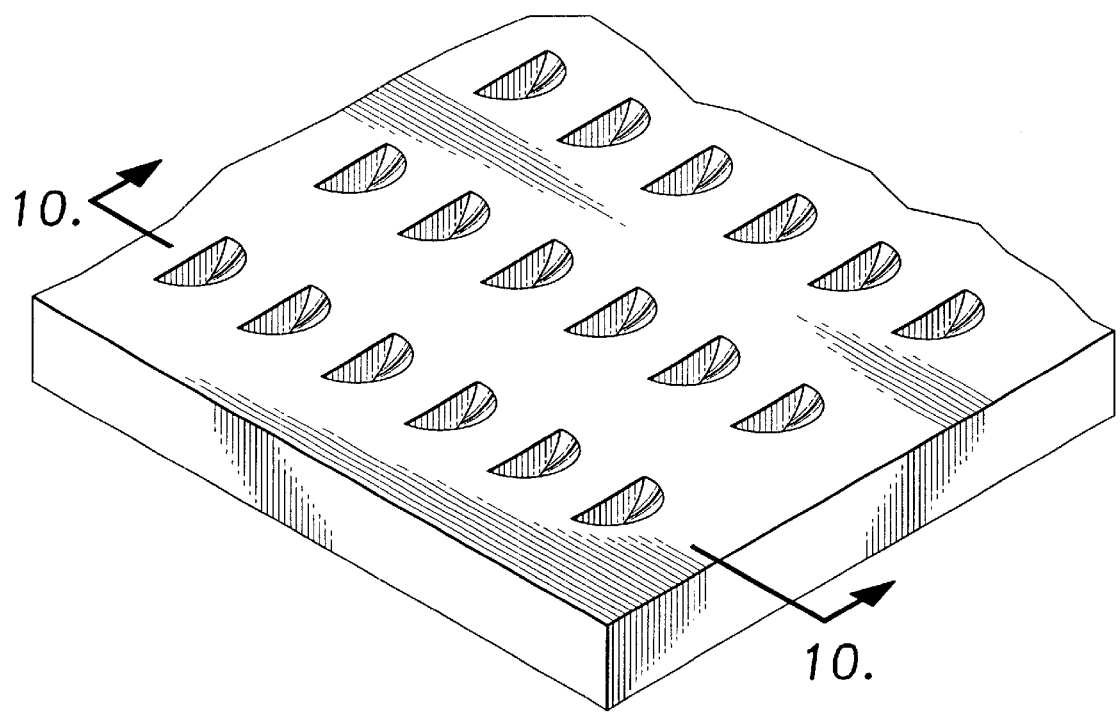
FIG. 9 is a fragmentary perspective view of the light pipe panel and quadraspherical depressions of FIG. 8.
Figure 10:
FIG. 10 is a cross-sectional view taken along line 10—10 of FIG. 9.

In accordance with the present invention, it has been found that the provision of quadraspherical depressions in one or both of the faces 12 and 14 of the light pipe panel 10 enhances the efficiency and uniformity of the light that is distributed by the light pipe. With particular reference to FIG. 8, one or both of the light pipe faces are provided with a plurality of quadraspherical depressions 40. Preferably, the depressions 40 are arranged in a plurality of spaced apart rows 42 which extend parallel to one another in straight lines extending across the face of panel 10 from one side edge 44 to the opposite side edge 46. Each row 42 begins adjacent to side edge 44 of the panel face and terminates adjacent to the opposite side edge 46. The rows 42 may be spaced uniformly apart from one another.

With continued reference to FIG. 8, the quadraspherical depressions 40 may vary in both their size and proximity. As shown in FIG. 8, the initial depressions 40 in each row (those located at near the left edge 44) may be relatively small and may be spaced relatively far apart. Closer to the opposite end of each row 42 (edge 46), the depressions 40 may be larger and spaced more closely together. Preferably, the depressions 40 progressively increase in size from one end of each row 42 to the opposite end, and they are also situated progressively closer together from one end of each row to the opposite end of the row.

This pattern resulting from varying both the size and proximity of the depressions 40, along with their arrangement in rows, has been found to enhance the efficiency and uniformity of the light distribution. However, it should be noted that the quadraspherical shape of each depression enhances the efficiency of the light pipe regardless of the distribution and size pattern of the depressions. It should also be noted that variations in size and proximity can be effected other than in the specific manner shown in FIG. 8, although the disclosed arrangement has been found to be particularly advantageous with respect to efficiency and uniformity of the light distribution.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A light pipe for distributing light from a source, said light pipe comprising:

a clear panel having opposite faces and a first side edge and a second side edge, wherein said first side edge is located proximate said light source and is for receiving incoming light, and wherein said second side edge is located distal said light source; and a plurality of depressions in one of said faces, each depression having a quadraspherical shape, wherein said depressions increase in size as distance from said light source increases, and wherein said depressions are largest proximate said second edge of said panel.

2. A light panel assembly, said light panel assembly comprising:

a clear light pipe panel having opposite faces and a first side edge and a second side edge, one of said faces presenting a plurality of spaced apart depressions each having a quadraspherical shape, wherein said depressions increase in size as distance from said light source increases, and wherein said depressions are largest proximate said second side edge;

a light source for applying light to said edge of the light pipe panel, wherein said first side edge is located proximate said light source and said second side edge is located distal said light source; and a display panel generally covering said light pipe panel.

3. A backlight for a display assembly, said backlight comprising:

a base panel presenting a reflective surface thereon and having a light source;

a clear light pipe panel on said reflective surface having opposite faces and a first side edge and a second side edge, said first side edge situated to admit light from said light source into the light pipe panel, one of said faces presenting a plurality of spaced apart depressions each having a quadraspherical configuration, wherein said depressions increase in size as distance from said light source increases, and wherein said depressions are largest proximate said second side edge; and a display panel covering said light pipe panel.

* * * * *